(12) United States Patent
Matsunoshita

(10) Patent No.: US 11,714,952 B2
(45) Date of Patent: Aug. 1, 2023

(54) DOCUMENT PROCESSING APPARATUS, DOCUMENT PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Junichi Matsunoshita, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 466 days.

(21) Appl. No.: 16/871,147

(22) Filed: May 11, 2020

(65) Prior Publication Data

US 2021/0192122 A1    Jun. 24, 2021

(30) Foreign Application Priority Data

Dec. 20, 2019    (JP) .................................. 2019-230462

(51) Int. Cl.
    *G06F 17/00*    (2019.01)
    *G06F 40/103*    (2020.01)
    *G06F 40/109*    (2020.01)

(52) U.S. Cl.
    CPC .......... *G06F 40/103* (2020.01); *G06F 40/109* (2020.01)

(58) Field of Classification Search
    CPC .............................. G06F 40/103; G06F 40/109
    See application file for complete search history.

(56) References Cited

U.S. PATENT DOCUMENTS

| 2014/0229390 | A1* | 8/2014 | Morris | G06Q 10/103 |
| | | | | 705/302 |
| 2015/0106697 | A1* | 4/2015 | Zhang | G06F 40/106 |
| | | | | 715/243 |
| 2015/0286742 | A1* | 10/2015 | Zhang | G06F 40/106 |
| | | | | 715/252 |
| 2019/0155882 | A1* | 5/2019 | Jain | G06V 30/413 |

FOREIGN PATENT DOCUMENTS

| JP | 2005-31977 A | 2/2005 |
| JP | 2018-120286 A | 8/2018 |

OTHER PUBLICATIONS

Aggarwal, Praveen, and Rajiv Vaidyanathan. "Is font size a big deal? A transaction-acquisition utility perspective on comparative price promotions." Journal of Consumer Marketing 33.6 (2016): 408-416 (Year: 2016).*

(Continued)

*Primary Examiner* — Andrew T McIntosh
(74) *Attorney, Agent, or Firm* — Oliff PLC

(57) ABSTRACT

A document processing apparatus includes a processor. The processor receives a document in which components suitable for a creation purpose are disposed. The processor extracts a piece of pattern information from pattern information stored in a memory. The extracted pattern information corresponds to the creation purpose of the received document. The memory stores the pattern information in which item values of items are set in association with a document creation purpose. The item values of the items define a document pattern. The processor refers to the extracted pattern information and sets a pattern for the components disposed in the received document.

8 Claims, 10 Drawing Sheets

(56) References Cited

OTHER PUBLICATIONS

Amar, Jennifer, Olivier Droulers, and Patrick Legohérel. "Typography in destination advertising: An exploratory study and research perspectives." Tourism Management 63 (2017): 77-86 (Year: 2017).*

Vladimirova, Genoveva. "Typography as a determining factor in the visual communication design." Knowledge-International Journal 19.3 (2017): 1333-1337 (Year: 2017).*

* cited by examiner

FIG. 2

| No. | PURPOSE INFORMATION ||||| INFORMATION-ITEM INFORMATION ||||||||||
| --- | --- | --- | --- | --- | --- | --- | --- | --- | --- | --- | --- | --- | --- | --- |
| | BUSINESS TYPE | SALES-PROMOTION PURPOSE | DOCUMENT TYPE | TARGET CUSTOMER | #1 | #2 | #3 | #4 | #5 | #6 | #7 | #8 | #9 | #10 |
| 1 | APPAREL SHOP | NOTIFICATION ABOUT REOPENING | DIRECT MAIL | FEMALES IN THEIR TWENTIES | THEME | SHOP NAME | GREETING | SHOP INFORMATION | MAIN VISUALS | — | — | — | — | — |
| 2 | APPAREL SHOP | NOTIFICATION ABOUT REOPENING | DIRECT MAIL | MALES IN THEIR FORTIES | THEME | SHOP NAME | GREETING | SHOP INFORMATION | COUPON | MAIN VISUALS | — | — | — | — |
| 3 | APPAREL SHOP | SALE | DIRECT MAIL | FEMALES IN THEIR TWENTIES | THEME | EYE CATCHER | PRODUCT INFORMATION | PRODUCT INFORMATION | PRODUCT INFORMATION | PRODUCT INFORMATION | SHOP INFORMATION | COUPON | MAIN VISUALS | — |
| 4 | APPAREL SHOP | SALE | BANNER IMAGE | FEMALES IN THEIR TWENTIES | THEME | EYE CATCHER | SHOP NAME | MAIN VISUALS | — | — | — | — | — | — |
| 5 | APPAREL SHOP | LETTER OF THANKS | DIRECT MAIL | FEMALES IN THEIR THIRTIES | DESTINATION | THEME | GREETING | SHOP INFORMATION | MAIN VISUALS | — | — | — | — | — |
| 6 | AUTOMOBILE SALES | CAMPAIGN | DIRECT MAIL | MALES IN THEIR THIRTIES | THEME | PRODUCT INFORMATION | GREETING | SHOP INFORMATION | COUPON | MAIN VISUALS | — | — | — | — |
| ... | | | | | | | | | | | | | | |

FIG. 3

| INFORMATION ITEM | DESCRIPTION ITEM | DATA FORMAT |
|---|---|---|
| 31 THEME | MAIN COPY | text |
| | SUB-COPY | text |
| | IMAGE PHOTOGRAPH | image |
| 32 THEME | MAIN COPY | text |
| | IMAGE PHOTOGRAPH | image |
| SHOP NAME | SHOP NAME | text |
| | LOGO IMAGE | image |
| SHOP NAME | SHOP NAME | text |
| SHOP NAME | LOGO IMAGE | image |
| 33 GREETING | HEADER COPY | text |
| | BODY COPY | text |
| SHOP INFORMATION | SHOP NAME | text |
| | ADDRESS | text |
| | TELEPHONE NUMBER | text |
| | URL | text |
| | LOGO IMAGE | image |
| | MAP | image |
| SHOP INFORMATION | SHOP NAME | text |
| | URL | text |
| | MAP | image |
| SHOP INFORMATION | LOGO IMAGE | image |
| | URL | text |
| PRODUCT INFORMATION | PRODUCT NAME | text |
| | PRICE | text |
| | PRODUCT PHOTOGRAPH | image |
| PRODUCT INFORMATION | PRODUCT NAME | text |
| | PRODUCT PHOTOGRAPH | image |
| PRODUCT INFORMATION | PRODUCT NAME | text |
| | PRICE | text |

FIG. 4

| CONTENT SET ID | INFORMATION ITEM | DESCRIPTION ITEM | DATA FORMAT | CONTENT ID | CONTENT DATA |
|---|---|---|---|---|---|
| CS0001 | THEME | MAIN COPY | text | C0001 | "SPRING SALE" |
| | | SUB-COPY | text | C0002 | "Biggest sale in this spring" |
| | | IMAGE PHOTOGRAPH | image | C0003 | image003.jpg |
| CS0002 | THEME | MAIN COPY | text | C0004 | "WINTER SALE" |
| | | SUB-COPY | text | C0005 | "Full of autumn-winter fashion" |
| | | IMAGE PHOTOGRAPH | image | C0006 | image004.jpg |
| CS0003 | THEME | MAIN COPY | text | C0007 | "OPENING SALE" |
| | | IMAGE PHOTOGRAPH | image | C0008 | image008.jpg |
| | | IMAGE PHOTOGRAPH | image | C0009 | image003.jpg |
| CS0004 | PRODUCT INFORMATION | PRODUCT NAME | text | C0010 | "Spring coat" |
| | | PRICE | text | C0011 | "19,800 yen" |
| | | PRODUCT PHOTOGRAPH | image | C0012 | image012.jpg |
| ... | | | | | |

FIG. 7

| BUSINESS TYPE | PURPOSE INFORMATION ||| STYLE INFORMATION ||||
|---|---|---|---|---|---|---|---|
| | SALES-PROMOTION PURPOSE | DOCUMENT TYPE | TARGET CUSTOMER | BASE COLOR | MAIN COLOR | ACCENT COLOR | FONT 1 | FONT 2 |
| APPAREL SHOP | NOTIFICATION ABOUT REOPENING | DIRECT MAIL | FEMALES IN THEIR TWENTIES | RGB11 | RGB23 | RGB44 | GOTHIC | GOTHIC |
| APPAREL SHOP | NOTIFICATION ABOUT REOPENING | DIRECT MAIL | MALES IN THEIR FORTIES | RGB11 | RGB24 | RGB43 | MINCHO | ROUND GOTHIC |
| APPAREL SHOP | SALE | DIRECT MAIL | FEMALES IN THEIR TWENTIES | RGB22 | RGB21 | RGB01 | ROUND GOTHIC | ROUND GOTHIC |
| APPAREL SHOP | SALE | BANNER IMAGE | FEMALES IN THEIR TWENTIES | RGB23 | RGB21 | RGB55 | GOTHIC | Times New Roman |
| APPAREL SHOP | LETTER OF THANKS | DIRECT MAIL | FEMALES IN THEIR THIRTIES | RGB11 | RGB13 | RGB41 | MINCHO | GOTHIC |
| AUTOMOBILE SALES | CAMPAIGN | DIRECT MAIL | MALES IN THEIR THIRTIES | RGB33 | RGB66 | RGB05 | ROUND GOTHIC | ROUND GOTHIC |
| . . . | | | | | | | | |

FIG. 8

| DESCRIPTION ITEM | SPECIFIC CONDITION |
|---|---|
| MAIN COPY | SEASONS, EVENTS |
| SUB-COPY | PRICE |
| PRODUCT INFORMATION | NUMBER |
| ⋮ | |

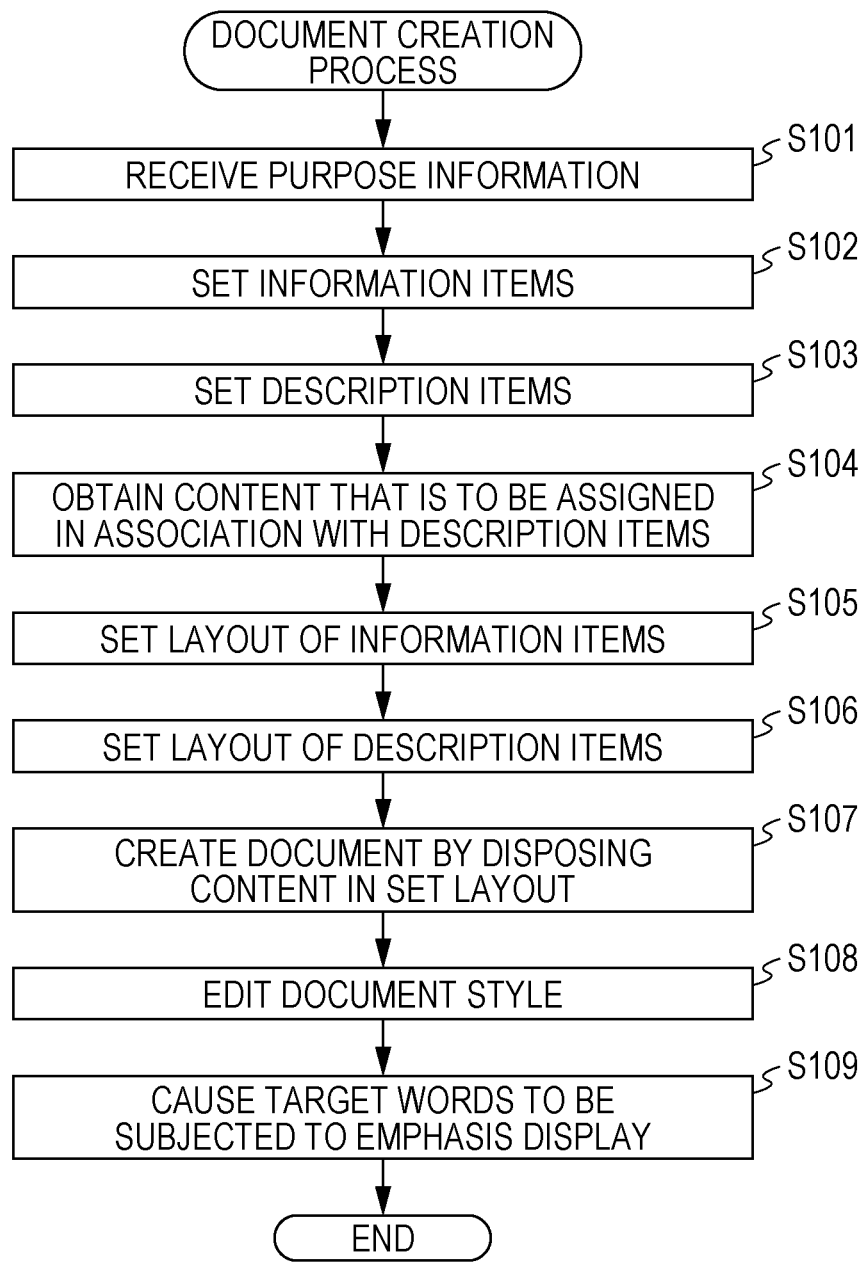

DOCUMENT PROCESSING APPARATUS, DOCUMENT PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-230462 filed Dec. 20, 2019.

BACKGROUND

(i) Technical Field

The present disclosure relates to a document processing apparatus, a document processing system, and a non-transitory computer readable medium.

(ii) Related Art

Most of the description items on a document related to sales promotion, such as direct mail or a handout, are determined when the target or the like is determined. In parts, which are to be conspicuous, of the description items of a document, some decoration is made so that some parts on the document are conspicuous and the other parts are inconspicuous.

For example, Japanese Unexamined Patent Application Publication No. 2005-031977 provides proposal of a technique in which feeling expression words are detected from the description of a document, and document decoration attributes, such as the font and the frame, corresponding to the detected feeling expression words are set.

Japanese Unexamined Patent Application Publication No. 2018-120286 discloses a technique of extracting feature words from input document data and outputting sentences corresponding to the extracted feature words.

SUMMARY

Aspects of non-limiting embodiments of the present disclosure relate to a technique which, when a document is to be created by arranging, on the document, components included in the document, supports an operation of setting a pattern of the components, which is suitable for the purpose of the document that is to be created, compared with the case in which the pattern of the components is set without consideration of the purpose of the document that is to be created.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a document processing apparatus including a processor. The processor receives a document in which components suitable for a creation purpose are disposed. The processor extracts a piece of pattern information from pattern information stored in a memory. The extracted pattern information corresponds to the creation purpose of the received document. The memory stores the pattern information in which item values of items are set in association with a document creation purpose. The item values of the items define a document pattern. The processor refers to the extracted pattern information and sets a pattern for the components disposed in the received document.

BRIEF DESCRIPTION OF THE DRAWINGS

Exemplary embodiment of the present disclosure will be described in detail based on the following figures, wherein:

FIG. 2 is a diagram illustrating an exemplary data configuration of information-item configuration information stored in an item-definition-information storage unit according to the present exemplary embodiment;

FIG. 3 is a diagram illustrating an exemplary data configuration of description-item configuration information stored in an item-definition-information storage unit according to the present exemplary embodiment;

FIG. 4 is a diagram illustrating an exemplary data configuration of content sets stored in a content-set storage unit according to the present exemplary embodiment;

FIG. 7 is a diagram illustrating an exemplary data configuration of real style information stored in a real-style information storage unit according to the present exemplary embodiment;

FIG. 8 is a diagram illustrating an exemplary data configuration of an emphasis-word dictionary stored in an emphasis-word dictionary storage unit according to the present exemplary embodiment;

FIG. 9 is a flowchart of a document creation process according to the present exemplary embodiment;

DETAILED DESCRIPTION

A suitable exemplary embodiment of the present disclosure will be described below on the basis of the drawings.

Figure 1:
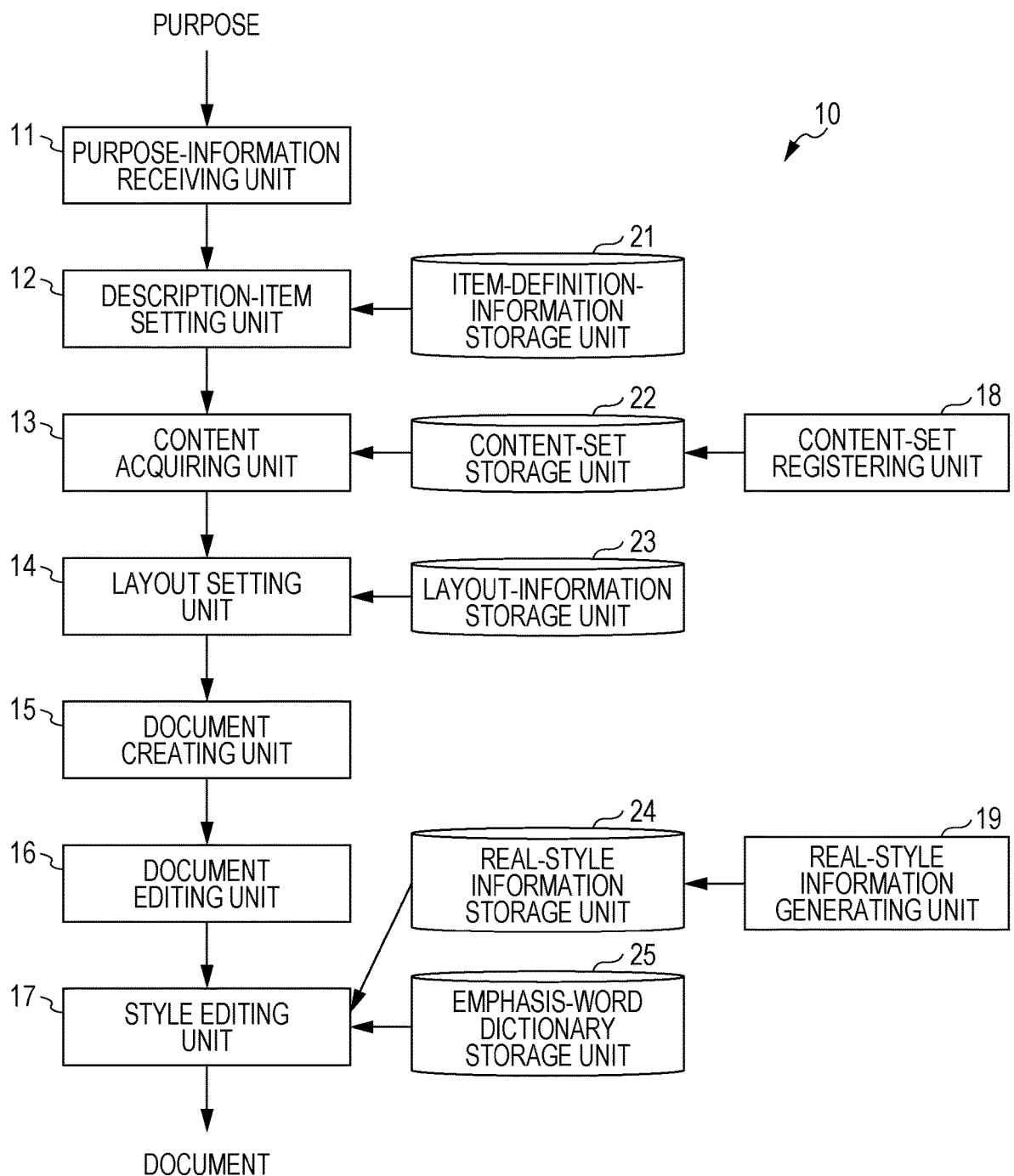
FIG. 1 is a diagram illustrating the block configuration of a document processing apparatus according to the present exemplary embodiment.

FIG. 1 is a diagram illustrating the block configuration of a document processing apparatus according to the present exemplary embodiment. A document processing apparatus 10 according to the present exemplary embodiment includes a purpose-information receiving unit 11, a description-item setting unit 12, a content acquiring unit 13, a layout setting unit 14, a document creating unit 15, a document editing unit 16, a style editing unit 17, a content-set registering unit 18, a real-style information generating unit 19, an item-definition-information storage unit 21, a content-set storage unit 22, a layout-information storage unit 23, a real-style information storage unit 24, and an emphasis-word dictionary storage unit 25. Components which are not used in the description about the present exemplary embodiment are not illustrated in FIG. 1.

The purpose-information receiving unit 11 receives purpose information indicating the document creation purpose specified by a user. The description-item setting unit 12 extracts item definition information corresponding to the purpose indicated by the received purpose information, from item definition information stored in the item-definition-information storage unit 21. Thus, the description-item setting unit 12 specifies description items of the document which are suitable for the document creation purpose. As described in detail below, in the present exemplary embodiment, to make it clear the difference from an "information item" which includes one or more items described in a document, an item which is to be described in the document may be referred to as a "description item" in addition to an "item". The content acquiring unit 13 selects a content set, which matches the combination of description items defined in the extracted item definition information, from the content sets stored in the content-set storage unit 22. Thus, the content acquiring unit 13 obtains the item values of the description items, that is, content data, described in the document actually. In the present exemplary embodiment, the item value of a description item is used as having the same meaning as "content" and "content data".

The layout setting unit 14 obtains layout information, corresponding to the specified combination of information items, from the layout information stored in the layout-information storage unit 23, thus setting the document layout. The document creating unit 15 creates a document by assigning the pieces of content, which are obtained by the content acquiring unit 13, to the respective given areas (hereinafter also referred to a "layout frame") on the layout which is set by the layout setting unit 14. The document editing unit 16 causes a user to perform edit operations, such as adjustment of the size of a layout frame for content which is positioned by the document creating unit 15.

The document suitable for the purpose is completed temporarily as described above. The style editing unit 17 extracts real style information, corresponding to the received document creation purpose, from real style information stored in the real-style information storage unit 24. The style editing unit 17 refers to the extracted real style information to set the pattern of components, which are disposed in the completed document, that is, the item values (corresponding to the "content") of the description items, thus converting the document to one more suitable for the purpose. The style editing unit 17 refers to the emphasis-word dictionary storage unit 25 to specify, from the document, content or part of content, which is to be subjected to emphasis display, as an emphasis display part. The style editing unit 17 converts the display form of the content so that the specified emphasis display part is subjected to emphasis display. The content-set registering unit 18 causes a user to register a content set in the content-set storage unit 22. The real-style information generating unit 19 analyzes a document which was generated in the past. Thus, the real-style information generating unit 19 generates real style information for the document, and registers the generated information in the real-style information storage unit 24.

FIGS. 2 and 3 are diagrams illustrating an exemplary data configuration of item definition information stored in the item-definition-information storage unit 21 according to the present exemplary embodiment. The item definition information defines one or more items, which serve as description items of a document, in association with the purpose of creation of the document (hereinafter referred to as the "document creation purpose" or simply the "purpose"). In the present exemplary embodiment, the item definition information includes two types of information, which are illustrated in FIGS. 2 and 3, that is, information-item configuration information and description-item configuration information.

The information-item configuration information illustrated in FIG. 2 defines information-item information including one or more items (hereinafter referred to as "information items"), which are obtained through classification by information content, in association with purpose information indicating the document creation purpose. In the present exemplary embodiment, a user specifies the document creation purpose by using the following items: the type of a user's business, "business type"; the purpose of sales promotion, "sales-promotion purpose"; the type of a document to be created, "document type"; and customers who are the target of the sale, "target customer". Thus, the purpose information includes these items. The information-item information includes one or more information items in association with the purpose indicated by the purpose information. For example, the item definition information, whose identification number, "No.", is 1 and which is illustrated in FIG. 2, describes the purpose by using a combination of the item values of the items including "apparel shop" as the business type, "notification about reopening" as the sales-promotion purpose, "direct mail" as the document type, and "females in their twenties" as the target customer. To attain the purpose, a document is created by using a combination of five information items: theme, shop name, greeting, shop information, and main visuals. In FIG. 2, a table, in which ten information items may be set, is prepared. The character, "–", is set in a setting area having no settings.

In the present exemplary embodiment, a description will be made by taking, as an example, the case in which the purpose is specified by using the four items. However, the number and types of items indicating a purpose are not necessarily limited to this. In addition, multiple pieces of information-item information having different combinations of information items, each of which has purpose information including the same set of specified item values, that is, which correspond to the same purpose, may be set. That is, multiple pieces of information-item configuration information, for which the purpose is the same, may be defined. The more the pieces of information-item configuration information defined for the same purpose are, the more the variations of completed document are.

The description-item configuration information illustrated in FIG. 3 has the configuration in which, for each information item, the description items included in the information item and the data formats of the description items are set. The information items in FIG. 3 are associated with the information items in the information-item configuration information illustrated in FIG. 2. The description items are actually-described items in a document as described above. In FIG. 3, multiple pieces of information-item configuration information may be set so as to have different combinations of included description items and to be associated with the same information item, "theme", as in description-item configuration information 31 and 32. The more the pieces of description-item configuration information defined for the same information item are, the more the variations of completed document are.

In the present exemplary embodiment, as illustrated in FIGS. 2 and 3, the items ("description items" illustrated in FIG. 3) included in a document are defined in two stages of hierarchy: the major item, which indicates the information items; and the sub-item, which is subordinate to the major item (that is, "description items"). Alternatively, without use of the information items, the description items may be defined directly in association with the document creation purpose. Alternatively, instead of two stages, three or more stages of hierarchy may be used in the definition.

FIG. 4 is a diagram illustrating an exemplary data configuration of content sets stored in the content-set storage unit 22 according to the present exemplary embodiment. Each content set indicates item information in which an information item, items, data formats, content IDs, and content data are set in association with the content set ID which serves as identification information of the content set. Among these, the information item, the items, and the data formats are those described in FIGS. 2 and 3. The setting information in FIG. 4 desirably matches information items, description items, and data formats which are illustrated in FIGS. 2 and 3. Each content ID is identification information of the corresponding content data. Each piece of content data indicates the item value of the corresponding item described actually in a document as described above. At least a set of an information item, description items, and content data, which is set for each content set, is provided by a user, and the content set is set in accordance with the provided information. Multiple content sets, which have the same set of an information item, description items, and data formats and which have different sets of a content ID and content data, may be registered. The more the content sets, having the same set of an information item, description items, and data formats, are, the more the variations of completed document are.

Figure 5:
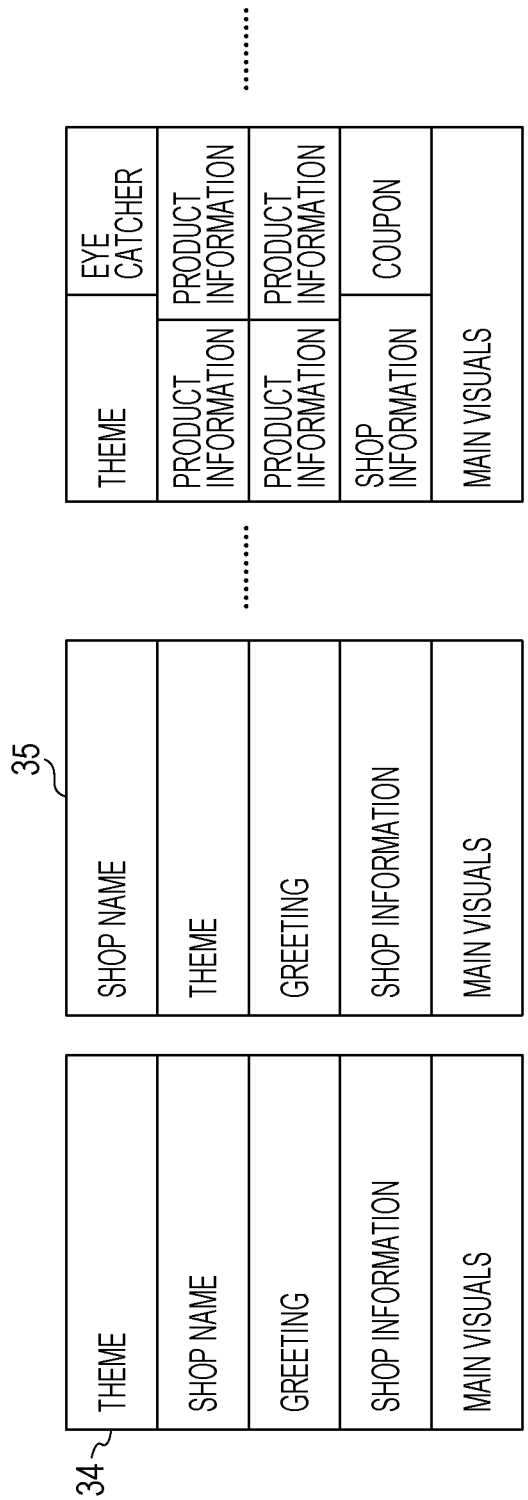
FIG. 5 is a diagram illustrating an exemplary data configuration of information-item layout information stored in a layout-information storage unit according to the present exemplary embodiment.
Figure 6:
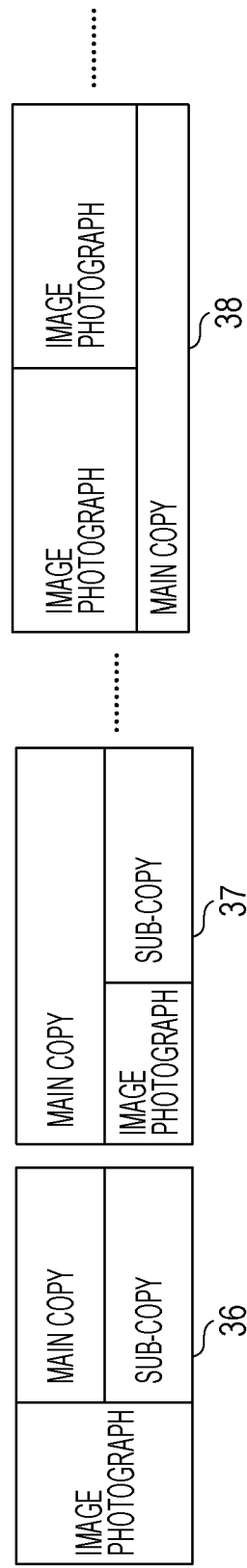
FIG. 6 is a diagram illustrating an exemplary data configuration of description-item layout information stored in a layout-information storage unit according to the present exemplary embodiment.

FIGS. 5 and 6 are diagrams illustrating an exemplary data configuration of layout information stored in the layout-information storage unit 23 according to the present exemplary embodiment. The layout information is arrangement information defining the positions at which the item values of the description items are to be disposed. In the present exemplary embodiment, the layout information has two types of information illustrated in FIGS. 5 and 6, that is, information-item layout information and description-item layout information.

The information-item layout information illustrated in FIG. 5 is arrangement information defining the arrangement of the information items, which are included in the information-item information, on a document. Each of blocks 34 and 35 illustrated in FIG. 5 indicates the sheet of a document, and indicates the positional relationship among the information items on the sheet. The block 34 indicates an exemplary case in which the information items of theme, shop name, greeting, shop information, and main visuals are disposed in this sequence from the top of a sheet. The block 35 has the same configuration of information items as that of the block 34, but the order of arrangement of the information items is different. As in this example, for the same information-item information, multiple pieces of layout information indicating different arrangements of the information items may be set in the information-item layout information.

The description-item layout information illustrated in FIG. 6 is item arrangement information defining the arrangement of the description items in the layout frame of each information item defined in the information-item layout information in FIG. 5. Each of blocks 36 and 37 illustrated in FIG. 6 indicates layout information corresponding to an information item, "theme", in this example, and corresponds to the layout frame in which the information item, "theme", illustrated in FIG. 5 is disposed. The information item, "theme", corresponding to each of the blocks 36 and 37, has the description items of main copy, sub-copy, and image photograph, but their positions in the layout frame are different. As in this example, in the description-item layout information, multiple pieces of layout information, in which the description items are disposed at different positions, may be set for the same information item. A block 38 indicates description-item layout information corresponding to the same information item, "theme", as that of the blocks 36 and 37, but the included description items are different. FIG. 6 illustrates only the information item, "theme". Description-item layout information may be defined for other information items similarly.

FIG. 7 is a diagram illustrating an exemplary data configuration of real style information stored in the real-style information storage unit 24 according to the present exemplary embodiment. The real style information is generated on the basis of documents which were created in the past, and has the configuration in which style information is set in association with purpose information indicating document creation purposes. The purpose information is the same as that included in the information-item configuration information illustrated in FIG. 2, and will not be described. The style information is pattern information indicating the item values of the items (hereinafter referred to as the "style items") defining the document pattern obtained by analyzing a document whose purpose is indicated by purpose information. In the present exemplary embodiment, "style" and "pattern" are used synonymously. Style information may define a style item describing at least one of color and font. The style information in the present exemplary embodiment defines style items about both color and font as illustrated in FIG. 7. The style items of "base color", "main color", and "accent color" are set as color. "Base color" is a base color of the document, and is the dominant color. "Main color" is a color used mainly in the document, and is the secondary color. "Accent color" is used not so frequently in the document, but is a color apart from the base color and the main color in view of the three attributes of color. "Accent color" is a color different from the hue of the entire document. As a matter of course, it is not necessary to include only these style items, and style items about other colors may be added. The font indicates fonts used in characters. The dominant and secondary fonts used in the document are set.

FIG. 8 is a diagram illustrating an exemplary data configuration of an emphasis-word dictionary stored in the emphasis-word dictionary storage unit 25 according to the present exemplary embodiment. In the emphasis-word dictionary, emphasis information, in which description items are set in association with specific conditions, is registered. Each description item is an item described in a document as described above. Each specific condition is a specific condition for specifying the item value or part of the item value, which is to be subjected to emphasis display, of a description item. Words, which are to be subjected to emphasis display, may be registered as they are in the emphasis-word dictionary. In the present exemplary embodiment, as illustrated in FIG. 8, if a word related to the seasons is to be subjected to emphasis display, instead of a word indicating a season, such as "spring" or "summer", comprehensive concept information such as "seasons", which corresponds to an upper concept of the content or part of content which is to be subjected to emphasis display, is set to a specific condition. Examples of concept information include seasons, events, characteristics, and number. The number indicates a number, such as a price, a discount rate, a limited number, a date and time, or a duration. The emphasis-word dictionary may have a configuration in which not only concept information about upper concepts, but also words, such as "spring" and "summer", indicating a lower concept, and specific words, such as a company name or a shop name, are set. Not only concept words and specific words, but also, for example, a rule indicating a part surrounded by specific symbols, such as "<" and ">", may be set.

The document processing apparatus according to the present exemplary embodiment may be implemented by using a hardware configuration of a general-purpose computer such as a personal computer (PC). That is, the document processing apparatus has a central processing unit (CPU), storage units, such as a read-only memory (ROM), a random-access memory (RAM), and a hard disk drive (HDD), a user interface, and a communication unit such as a network interface.

The components 11 to 19 in the document processing apparatus 10 are implemented through cooperative operations between a computer forming the document processing apparatus 10 and programs operating in the CPU included in the computer. The storage units 21 to 25 are implemented by using an HDD included in the document processing apparatus 10.

Alternatively, the document processing apparatus may be formed of a cloud or multiple computers. For example, the components 11 to 19 may be disposed in a computer different from that in which the storage units 21 to 25 are included. The computer including the components 11 to 19 may use the storage units 21 to 25, which are present outside, over a network.

The programs used in the present exemplary embodiment may be provided not only through a communication unit but also by storing the programs in a computer-readable recording medium, such as a compact disc-read-only memory (CD-ROM) or a Universal Serial Bus (USB) memory. The programs provided through the communication unit or a recording medium are installed in a computer. The CPU of the computer executes programs sequentially, thus implementing various processing.

Operations according to the present exemplary embodiment will be described. The present exemplary embodiment is characterized by supporting creation of a document which is suitable for the corresponding purpose. To create a document suitable for the corresponding purpose, in the storage units 21 to 25, the pieces of information described above need to be set in advance. The item definition information, the layout information, the real style information, and the emphasis-word dictionary are set in advance by a document creation service company which owns the document processing apparatus 10. In contrast, at least combinations of an information item, description items, and content data, in a content set, need to be provided by users as described above. Therefore, the content-set registering unit 18 generates content sets on the basis of information provided from the users, and registers the generated data in the content-set storage unit 22. When a technique of the related art is used to complete a document through processes described below, the real-style information generating unit 19 analyzes the document and obtains the color and font used in the document, thus obtaining style information. The real-style information generating unit 19 registers, in the real-style information storage unit 24, the obtained style information in association with the purpose information of the document which is received by the purpose-information receiving unit 11. For convenience of the description, a description will be made under the assumption that a document created in the present exemplary embodiment is formed of a single page, such as a handout, a pop-up image, a banner image, or direct mail.

The document creation process according to the present exemplary embodiment will be described below by using the flowchart illustrated in FIG. 9.

A user inputs a document creation purpose from a given purpose specification screen. In the present exemplary embodiment, the business type, the sales-promotion purpose, the document type, and the target customer are illustrated as items for specifying the purpose. Thus, the item values are specified for the respective items. For example, a user may input the item values of the items manually. In the present exemplary embodiment, a pull-down menu for displaying a list including the item values is prepared for each item. A user selects an item value, matching the purpose, from the pull-down menu. Typically, a user specifies one item value for each item. However, all of the items are not necessarily specified. Alternatively, multiple item values may be specified for a single item.

In the present exemplary embodiment, assume the case in which a user outside uses a service provided by a document creation service company which owns the document processing apparatus 10. Therefore, an employee of the document creation service company may ask the user about the purpose, and may input the purpose in the document processing apparatus 10. Alternatively, a user may access the document processing apparatus 10 over a network such as the Internet from a terminal of a PC or the like used by the user. In this case, the user performs a given operation to cause the purpose specification screen, which has been transmitted from the document processing apparatus 10, to be displayed on the PC through a browser, thus specifying the item value of each item indicating the purpose. The purpose-information receiving unit 11 receives the purpose information including the item values of the items indicating the purpose specified as described above (step 101).

Then, the description-item setting unit 12 extracts information-item information corresponding to the combination of the item values of the items included in the purpose information, from the information-item configuration information which is illustrated in FIG. 2 and which is included in the item-definition-information storage unit 21. Thus, the description-item setting unit 12 sets information items included in the document (step 102). Thus, in the present exemplary embodiment, it is determined which types of item information are to be included to create a document so that the purpose is attained.

As described above, the user may specify not all items, indicating the purpose, from the purpose specification screen. In this case, item definition information corresponding to the specified item values for the purpose is searched for and is obtained. Thus, multiple pieces of item definition information may be obtained. For example, a user specifies "apparel shop" as the business type, "notification about reopening" as the sales-promotion purpose, and "direct mail" as the document type, but does not specify the target customer. In this case, the description-item setting unit 12 obtains records No. 1 and 2 as the records which match the specified items. In addition, the item-definition-information storage unit 21 may have multiple pieces of information-item configuration information which are registered for the same purpose. Also in this case, the description-item setting unit 12 obtains multiple pieces of information-item information. Thus, when multiple pieces of information-item information corresponding to the purpose indicated by the received purpose information are stored in the information-item configuration information in the item-definition-information storage unit 21, the description-item setting unit 12 may present, to the user, the pieces of information-item configuration information, corresponding to the purpose, and may cause the user to select one record, that is, one piece of information-item information, from the presented pieces of information-item configuration information. Alternatively, for example, the description-item setting unit 12 may select one piece automatically in accordance with a given selection criterion, such as selection of one having a smaller record number, selection of one which was selected more frequently in the past, or calculation of purpose-matching rates with weighting on the items included in the purpose information. The same is true for the case in which multiple item values are selected for a single item. The information-item information corresponding to the specified purpose is extracted from the information-item configuration information which is set in the item-definition-information storage unit 21.

The description-item setting unit 12 extracts the description items corresponding to the information items determined in step 102, from the description-item configuration information which is stored in the item-definition-information storage unit 21 and which is illustrated in FIG. 3, and thus sets items (that is, description items) described in the document (step 103). For example, when the information items which are set in step 102 include "greeting", in the setting example in FIG. 3, there is only a single record, corresponding to the information item, "greeting", that is description-item configuration information 33. Thus, the description items are determined uniquely as "header copy" and "body copy". For example, there are multiple records corresponding to the information item, "theme", that is, the description-item configuration information 31 and 32. Thus, when multiple pieces of description-item configuration information corresponding to an information item are stored in the item-definition-information storage unit 21, the description-item setting unit 12 may present the description-item configuration information to the user, and may cause the user to select any one of the records (that is, the description-item configuration information). Alternatively, for example, the description-item setting unit 12 may select one automatically in accordance with a given selection criterion, such as selection of one having a larger number of description items included in the information item, or selection of one which was selected more frequently in the past.

The content acquiring unit 13 obtains content that is to be assigned in association with each determined description item (step 104). In step 103, the description-item setting unit 12 has determined which description items are to be assigned to each of the information items determined in step 102. For example, when it has been determined that the description items are formed by using a combination of "main copy", "sub-copy", and "image photograph" for the information item, "theme", the content acquiring unit 13 extracts a content set for which information item is "theme, and which is formed of" a combination of the description items, "main copy", "sub-copy", and "image photograph", from the content sets stored in the content-set storage unit 22. Thus, the content acquiring unit 13 obtains content included in the content set. In the setting example illustrated in FIG. 4, content sets, whose content set IDs are CS0001 and CS0002, are extracted. Thus, when multiple content sets matching a combination of an information item and description items, which is determined by the description-item setting unit 12, are registered, the content acquiring unit 13 presents the content sets, especially, content data, to the user, and causes the user to select any one of the content sets.

As described above, when the content acquiring unit 13 determines content corresponding to the items described in the document, the layout setting unit 14 sets the layout of the information items first (step 105). The information-item layout information illustrated in FIG. 5 and stored in the layout-information storage unit 23 includes layout information defining the arrangement of the information items on a document. Thus, the layout setting unit 14 refers to the information-item layout information corresponding to the information items included in the information-item information extracted in step 102, and sets the layout of the information items. When only one piece of information-item layout information is set for a single set of information items, the layout setting unit 14 may specify the single piece of information-item layout information automatically for the information items. When, like the information-item layout information 34 and 35 illustrated in FIG. 5, multiple pieces of information-item layout information including the same set of information items are stored in association with a single piece of information-item information in the layout-information storage unit 23, the layout setting unit 14 may cause the user to select one piece of information-item layout information from the multiple pieces of information-item layout information. Alternatively, for example, the layout setting unit 14 may select one automatically in accordance with a given selection criterion, such as selection of one which was selected more frequently in the past, or calculation of purpose-matching rates with weighting of the information items included in the information-item layout information.

As described above, after the layout of the information items is set, the layout setting unit 14 sets the layout of the description items included in each information item (step 106). That is, the document creating unit 15 disposes content of the description items in the layout frame of each information item laid out on the document. In this step, the layout setting unit 14 selects description-item layout information used in the arrangement. When, for one information item, only one piece of description-item layout information for the same set of description items included in the information item is set, the layout setting unit 14 may specify the piece of description-item layout information automatically for the information item. Like the description-item layout information 36 and 37 illustrated in FIG. 6, when multiple pieces of description-item layout information including the same set of description items (that is, "main copy", "sub-copy", and "image photograph") are stored in association with one information item in the layout-information storage unit 23, the layout setting unit 14 may cause the user to select one piece from the pieces of description-item layout information. Alternatively, for example, the layout setting unit 14 may select one automatically in accordance with a given selection criterion such as selection of one which was selected more frequently in the past.

As described above, when the arrangement of information items and the arrangement of the description items in the layout frame of each information item on the document are set, the document creating unit 15 creates the document by disposing the content, which is obtained by the content acquiring unit 13, by assigning the content to the areas (hereinafter referred to as the "description frames"), in which the description items are described and which are set by the layout setting unit 14 (step 107).

As described above, the document may be created. However, the size of content may mismatch the size of the description frame of the corresponding description item. As a matter of course, content may be expanded or reduced in size so that such a situation is addressed. For example, if the content is reduced in size excessively, the information of the content may be difficult to recognize. In addition, the balance of the content in the entire document needs to be considered. This is a reason why the present exemplary embodiment includes the document editing unit 16. The document editing unit 16 displays the document, which is created by the document creating unit 15, on a PC used by the user. The user adjusts the sizes of the layout frames of the information items and the sizes of the description frames of the description items included in each information item. Thus, the user may adjust the balance of content on the document and may complete the document. Alternatively, instead of causing the user to always perform adjustment operations, the document editing unit 16 compares the size of content with the size of the description frame of the corresponding description item. If the difference falls in a given threshold, the document editing unit 16 may perform an automatic adjustment operation. If the difference exceeds the given threshold, the document editing unit 16 may cause the user to perform the adjustment operations as described above.

As described above, a document suitable for a purpose may be created. In the present exemplary embodiment, the style of the document may be edited so that the document is more suitable for the purpose.

That is, the style editing unit 17 obtains the purpose information of the document, for example, from the purpose-information receiving unit 11. Then, the style editing unit 17 refers to the real-style information storage unit 24 to extract real style information including style information, corresponding to the obtained purpose information, from the real style information stored in the real-style information storage unit 24, thus obtaining the style information. The style editing unit 17 edits the style of the document in accordance with the obtained style information (step 108). Thus, in the present exemplary embodiment, the style information, which was applied to a document of the same purpose which was created in the past, is applied also to the document created this time.

When multiple pieces of real style information including the same purpose information as that of the document are stored in the real-style information storage unit 24, the style editing unit 17 may present, to the user, the multiple pieces of style information corresponding to the purpose, and may cause the user to select one record, that is, one piece of style information, from the presented pieces of style information. Alternatively, for example the style editing unit 17 may select one automatically in accordance with a given selection criterion, such as adoption of style information which was selected the most frequently in the past, or adoption of the item value which appear the most frequently in each style item.

When the style of the document is determined, the style editing unit 17 refers to the emphasis-word dictionary to specify content or a part of content, which is to be subjected to emphasis display, as an emphasis display part. As described above, in the emphasis-word dictionary, specific conditions for specifying emphasis display parts are set. Thus, for example, natural language processing is performed on the document so that words included in the document are extracted. Then, it is determined whether each extracted word matches the concept information which is set to the specific conditions. A given emphasis display process is performed on matching words. If the content is an image, image analysis processing may be performed to extract characters in the image. In the present exemplary embodiment, assume that the emphasis target is a word. Not only a word but also an object, such as an animal or a plant, may be extracted from the image and may be subjected to emphasis display.

It may be assumed that words, which are to be subjected to emphasis display, are different depending on the type of a description item, for example, the type of content, such as the main copy or product information. Thus, in the present exemplary embodiment, words, which are to be subjected to emphasis display, may be set in accordance with the type of content. For example, in product information, the discount rate and the price may be to be emphasized. Thus, the parts for the discount rate and the price are subjected to emphasis display.

Figure 10A:
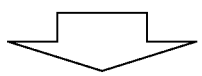
FIG. 10A is a diagram illustrating an example of the case in which content is changed for emphasis display, according to the present exemplary embodiment.
Figure 10B:
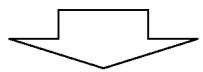
FIG. 10B is a diagram illustrating another example of the case in which content is changed for emphasis display, according to the present exemplary embodiment.

FIGS. 10A and 10B illustrate content examples obtained before and after being subjected to emphasis display through a given emphasis display process. FIG. 10A illustrates an example in which a word, "spring", is subjected to emphasis display. The word, "spring", corresponds to "seasons" that is set for the specific condition, and is included in content, "Big spring sale". The method of emphasis display illustrated in FIG. 10A involves conversion of the display form, that is, an increase in the character size and a change of the character color to the accent color.

In the example illustrated in FIG. 10A, the conversion of the display form of the emphasis display part, "spring", especially, an increase in the character size, narrows the display area in the description frame of the part other than "spring", that is, "Big" and "sale", in the content. Therefore, the style editing unit 17 changes the display form of the part other than the emphasis display part. Specifically, adjustment may be made in such a manner that the character size in the part other than the emphasis display part is made smaller so that the description frame which is set for the content accommodates the entire content. Alternatively, in accordance with an increase in the character size of the emphasis display part, "spring", the description frame itself of the content, "Big spring sale", may be made larger. In this case, the style editing unit 17 may adjust the arrangement of the content other than the content including the emphasis display part. For example, on the document, the description frame for the content adjacent to the content including the emphasis display part may be adjusted so that the display position is shifted or the size is made smaller. Thus, the concept, "adjustment of arrangement", encompasses adjustment of the size of a description frame in addition to adjustment of shifting the position of a description frame on a document.

FIG. 10B illustrates an example of the case in which, for content, "50% off all merchandise", specified as an emphasis display part, the background is decorated by using graphics. In addition, the display form is converted so that the character size of the numeric part is made larger and the character color is changed to the accent color.

Thus, the style editing unit 17 converts the display form of the component so that the specified emphasis display part is subjected to emphasis display. In addition, the display form of the part other than the emphasis display part is adjusted, for example, so that the character size is made smaller in accordance with the change in the display form of the emphasis display part.

As described above, in the present exemplary embodiment, actual cases in the past of application of styles to documents are referred to, and a style corresponding to the document creation purpose is used, achieving creation of a document with a style more suitable for the document creation purpose. To do this, it is desirable that a style which was well received in the past, that is, a style which may contribute attainment of the purpose be used for the document. Therefore, for example, the real style information is ranked in accordance with how well each record was received, or only style information which was well received is stored in the real-style information storage unit 24. Thus, a created document may be suitable for the document creation purpose.

In the embodiment above, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A document processing apparatus comprising:
   a processor configured to:
      receive a document in which components suitable for a creation purpose are disposed,
      extract a piece of pattern information from pattern information stored in a memory, the extracted pattern information corresponding to the creation purpose of the received document, the memory storing the pattern information in which item values of items are set in association with a document creation purpose, the item values of the items defining a document pattern, and
      refer to the extracted pattern information and set a pattern for the components disposed in the received document, wherein:
   the processor refers to emphasis information in which a specific condition is set in advance, the specific condition being used to specify a component or part of component which is to be subjected to emphasis display, and specifies a component or part of component as an emphasis display part from the received document, the component or part of component to be subjected to emphasis display,
   the processor converts display form of the component in such a manner that the specified emphasis display part is subjected to emphasis display,
   in accordance with conversion of the display form of the emphasis display part, the processor adjusts display form of part other than the emphasis display part of the component, the component including the emphasis display part, or adjusts an arrangement of the component other than the component including the emphasis display part, and
   the processor adjusts a size of part other than the emphasis display part of the component, the component including the emphasis display part.

2. The document processing apparatus according to claim 1, wherein the pattern information is set by associating the item values of the items with purpose information, the purpose information indicating a creation purpose of a document created in the past, the item values of the items defining the pattern of the document and being obtained by analyzing the document.

3. The document processing apparatus according to claim 2, wherein each item defining the pattern is an item about at least one of color and font.

4. The document processing apparatus according to claim 1, wherein, if a display area of the component including the emphasis display part is made larger due to conversion of the display form of the emphasis display part, the processor adjusts a display position of a component other than the component including the emphasis display part.

5. The document processing apparatus according to claim 1, wherein, in the specific condition, concept information is set, the concept information generally indicating a component or part of component which is to be subjected to emphasis display.

6. The document processing apparatus according to claim 5,
   wherein the concept information indicates seasons, events, or number.

7. A document processing system comprising;
   a processor; and
   a pattern-information memory that stores pattern information in which a component for defining a document pattern is set in association with a document creation purpose,
   wherein the processor is configured to:
      receive a document in which item values of items suitable for the creation purpose are disposed,
      extract, from the pattern-information memory, pattern information corresponding to the received document creation purpose, and
      refer to the extracted pattern information and set a pattern of the received document, wherein:
   the processor refers to emphasis information in which a specific condition is set in advance, the specific condition being used to specify a component or part of component which is to be subjected to emphasis display, and specifies a component or part of component as an emphasis display part from the received document, the component or part of component to be subjected to emphasis display,
   the processor converts display form of the component in such a manner that the specified emphasis display part is subjected to emphasis display,
   in accordance with conversion of the display form of the emphasis display part, the processor adjusts display form of part other than the emphasis display part of the component, the component including the emphasis display part, or adjusts an arrangement of the component other than the component including the emphasis display part, and
   the processor adjusts a size of part other than the emphasis display part of the component, the component including the emphasis display part.

8. A non-transitory computer readable medium storing a program causing a computer to execute a process comprising:

receiving a document in which components suitable for a creation purpose are disposed, extracting pattern information from pattern information stored in a memory, the extracted pattern information corresponding to the creation purpose of the received document, the memory storing the pattern information in which item values of items are set in association with a document creation purpose, the item values of the items defining a document pattern, referring to the extracted pattern information and setting a pattern for the components disposed in the received document, referring to emphasis information in which a specific condition is set in advance, the specific condition being used to specify a component or part of component which is to be subjected to emphasis display, and specifies a component or part of component as an emphasis display part from the received document, the component or part of component to be subjected to emphasis display, converting display form of the component in such a manner that the specified emphasis display part is subjected to emphasis display, in accordance with conversion of the display form of the emphasis display part, adjusting display form of part other than the emphasis display part of the component, the component including the emphasis display part, or adjusting an arrangement of the component other than the component including the emphasis display part, and adjusting a size of part other than the emphasis display part of the component, the component including the emphasis display part.

\* \* \* \* \*